United States Patent [19]

Connelly

[11] 4,182,070
[45] Jan. 8, 1980

[54] TAMPER-PROOF POISONOUS BAIT BOX

[75] Inventor: Richard E. Connelly, Jeromesville, Ohio

[73] Assignee: Contractor Equipment Manufacturers, Inc., Ashland, Ohio

[21] Appl. No.: 895,437

[22] Filed: Apr. 11, 1978

[51] Int. Cl.² .............................................. A01M 25/00
[52] U.S. Cl. ...................................... 43/131; 220/263; 220/264
[58] Field of Search ................. 43/61, 67, 131, 132 R; 220/20.5, 263, 264

[56] References Cited

U.S. PATENT DOCUMENTS

| 736,387 | 8/1903 | Harker | 43/131 |
| 4,091,560 | 5/1978 | Haertling | 43/131 |

Primary Examiner—Nicholas P. Godici
Assistant Examiner—K. Bradford Adolphson
Attorney, Agent, or Firm—Baldwin, Egan, Walling & Fetzer

[57] ABSTRACT

A two-part box surrounds the bait in the back of the box on all sides, except in front, where the box area is closed by a swinging door supported from its upper edge and spring-urged to a closed position. The door is manually set in an open position in a generally horizontal direction and releasably held there by a support pin or trip rod which is supported to move freely in vertical direction through an opening in the bottom, and the pin is held in the support position when the box is resting on a surface and the door is resting on the pin. On removal of the box away from the surface, the pin drops down and the door closes, so no one can touch the bait until the door is manually re-set in open position.

3 Claims, 3 Drawing Figures

TAMPER-PROOF POISONOUS BAIT BOX

PRIOR ART

In prior art rodent traps, the bait which oftentimes may be poisonous and disposed on the trap triggering element within the open trap housing or the like, is freely available to a child who merely reaches into the baited trap and is able to pick the bait and become poisoned thereby. In this type of trap structure, the bait is generally confined in an area within the trap to prevent it from being easily accessible to a small child.

FIELD OF THE INVENTION

Vermin destroying traps, such as poison holders.

SUMMARY OF THE INVENTION

An object of the present invention is to provide a tamper-proof poisonous bait box comprised of a lower box portion of sheet material and an upper box portion of sheet material, with both of said box portions being generally rectangular and with the upper box portion being shorter at one end than the lower box portion and otherwise with its sides and other end meeting the sides and the associated end of the lower box portion tightly, together with releasable means for holding the box portions together. A swinging door having parallel linear sides with the upper edge of the door having a horizontal hinge connection with the top wall of the upper box portion and with a spring operatively connected with the door urging the same to swing the free end of the door downwardly and with the width of the door being greater than the vertical distance between the top and bottom of the combined box portions so that the door under urging by the spring will hit the bottom wall of the lower box portion before it reaches vertical position. The invention includes a rigid door-support pin in a position beneath the free edge of the door in its open position, with the pin having a support structure mounting the pin for free vertical movement so that poisonous bait may be placed in the back part of the lower box portion, the box portions then being secured together, and the door moved against the spring action to a generally horizontal position extending rearwardly, and then the support pin is held upward in support position while the box is set down on a supporting surface. Thereafter subsequent movement of the box away from the surface will permit the support pin to drop and the door to fall to a closed position, after which the poisonous bait cannot be touched until the door is manually re-set in said pin-supported position.

Other objects and advantages of the invention will be set forth in the accompanying specification and will be shown in the accompanying drawings. The essential features of the invention will be set forth in the appended claims.

BRIEF DESCRIPTION OF THE DRAWINGS

In the drawings,

FIG. 2 is a top plan view of the box of FIG. 1; while

DESCRIPTION OF THE PREFERRED EMBODIMENT

Figure 1:
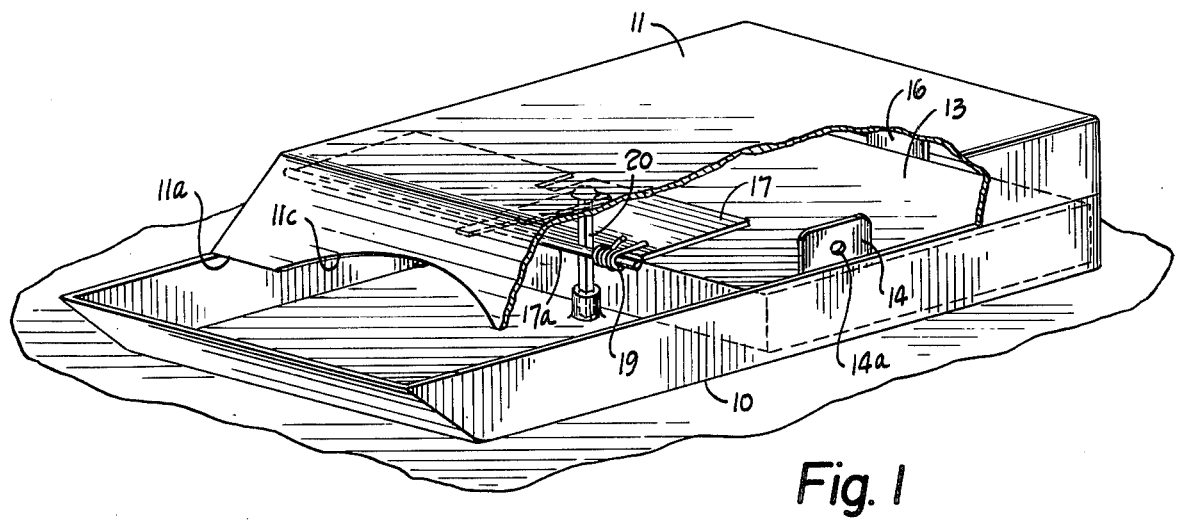
FIG. 1 is a perspective view of the complete bait box with the door in its open supported position, certain parts being broken away to more clearly show the construction.

The box here shown comprises a lower box portion 10 and an upper box portion 11. Both box portions are of sheet material which may be of metal or a suitable plastic. It will be noted that the upper box portion is of generally rectangular cup shape opening downwardly and the lower box portion 10 is of generally rectangular cup shape opening upwardly. It will be seen that the upper box portion, as at 11a, is shorter at the front end than the lower box portion 10, thereby permitting the entry of an animal, such as a rat, to get at the bait shown at 11 in the rear part of the lower box portion. Otherwise, the two box portions have meeting horizontal edges along the sides and along the other end of the rectangle and means is provided for assembling the two box portions, as shown in the drawings. In this embodiment this means comprises tabs 14, opposite each other on opposite sides of the box and tab 16 on the rear wall, and in position to slide into the upper box portion when the box is assembled, and releasable means is provided for holding the box portions together such as screws 15 which enter suitable registering openings in the sides of the upper box portion 11b and 14a in the tabs 14 and 16. Other known releasable means might be provided.

Figure 3:
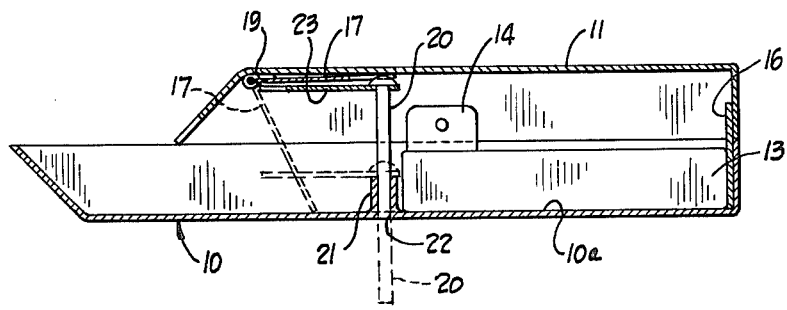
FIG. 3 is a sectional view of the same taken along the line 3—3 of FIG. 2.

A swinging door 17 is provided which has parallel linear sides and extends generally entirely across the box, as shown in the drawings. The upper edge of the door has a horizontal hinge connection 17a and supported in openings 18 in the upper box portion 11. This door is normally urged toward closed position, as shown in broken lines in FIG. 3, by means of a helical spring 19 on at least one end of the hinge 17a and pressing against the door 17 to urge it at all times from the position shown in FIG. 1 to the position shown in dotted lines in FIG. 3. It will be noted that in the dotted line position of FIG. 3, the free edge of the door 17 has struck the bottom wall 10a of the lower box portion before it has reached a vertical position. In other words, the door 17 in the dotted line position of FIG. 3 is held completely closing the space around the bait box 15 impelled by the strength of the spring 19. This is because the width of the door 17 is greater than the vertical distance from the top wall of the upper box portion to the bottom wall of the lower box portion.

A rigid door-support pin 20 is provided, preferably in the center of the door, in a position beneath the free edge of the door 17 in the full line position of FIG. 3. This pin has a support structure 21 in the lower box portion which mounts the pin 20 for free vertical movement from the full line position of FIG. 3 to the broken line position shown there. It will be noted in FIGS. 1 and 3 that the pin 20 is of a length to just pass through the bottom wall 10a of the lower box portion when the pin is in support position. In other words, the pin 20, in the full line position of FIG. 3, engages at 22 on whatever supporting surface is beneath the box.

Use of the construction thus described is as follows. Poisonous bait 13 may be placed in the back part of the lower box portion 10 and the box portions 10 and 11 then being secured together by use of the screws 15 as previously described. The operator then extends his hand in the open front of the lower box portion and presses the door 17 from the dotted line position of FIG. 3 to the full line position shown therein, at the same time the operator holds the pin 20 in its uppermost vertical position against the door 17 in its full line position and sets the box down on a supporting surface. Thus, the bait is open to an animal going into the open front end of the box portion 10 to get at the bait at 13. If the box is later moved away from the supporting surface this will permit the support pin 20 to drop freely downwardly which will cause the door 17 to fall to its closed position shown in dotted lines in FIG. 3. In such condition of the parts, the poisonous bait cannot be touched until the door 17 is manually re-set in its pin-supported position as shown in full lines in FIG. 3.

Figure 2:
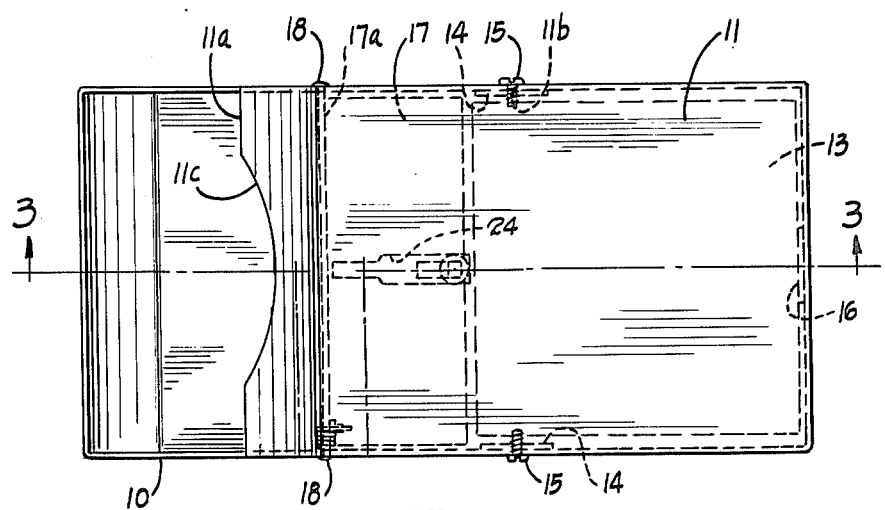

Preferably the front end 11a of the upper box portion extends downwardly to meet the sides of the lower box portion. Preferably, the central portion is cut away at 11c, as shown in FIGS. 1 and 2, so as to easily permit the hand of an operator to be inserted there to re-set the door 17 in its pin-supported position.

If desired, a safety arm 23 may be rigidly attached to the door-support pin 20 near its upper end, and extending forwardly from the support pin and being of a length to prevent the door 17 from being re-set from its closed position without first pushing the support pin 20 upwardly. To permit this action the door 17 has been slotted partly across vertically, as shown at 24, and it can be seen in FIG. 3 that the door 17 may not be moved upwardly out of the dotted line position of FIG. 3 until the pin 20 has been moved to its uppermost vertical position.

I claim:

1. A tamper-proof poisonous bait box, comprising a lower box portion of sheet material having a bottom wall and integral sides opening upwardly, an upper box portion of sheet material having a top wall and integral sides opening downwardly, said box portions being generally rectangular, said upper box portion being shorter at its front end than said lower box portion and with its sides and back end meeting the sides and the associated end of the lower box portion tightly, releasable means for holding said box portions together, a swingable door having parallel linear sides at its upper and lower edges and extending generally entirely across said box, the upper edge of said door having a horizontal hinge connection with said side walls of said upper box portion, a spring operatively connected with said door urging the same to swing the free lower edge of said door downwardly, the width of said door being greater than the vertical distance from the top wall of said upper box portion to the bottom wall of said lower box portion so that said door under urging by said spring will hit said bottom wall of said lower box portion before it reaches vertical position, and a rigid door-support pin in said lower box portion in a support position beneath the free lower edge of said door when the latter extends generally horizontally away from its hinge connection, said pin in said support position being of a length to just pass through said bottom wall of said lower portion, said bottom wall of said lower box portion having a support structure mounting said pin for free vertical movement, whereby poisonous bait may be placed in the back part of said lower box portion and said box portions secured together and said door moved against said spring action to a generally horizontal position extending rearwardly from its hinge connection, then said support pin is held upward in said support position while said box is set down on a supporting surface, and subsequent movement of said box away from said supporting surface will permit said support pin to drop and said door to fall to a closed position, after which said poisonous bait cannot be touched until said door is manually re-set in said support position.

2. A tamper-proof poisonous bait box as defined in claim 1, wherein the top wall of said upper box portion at said front end extends downwardly and is cut away in a central portion midway between said integral sides to easily permit a hand to be inserted to re-set said door in said support position.

3. A tamper-proof poisonous bait box as defined in claim 1, including a safety arm rigidly attached to said door-support pin near its top, said safety arm extending forwardly from said pin and being of a length to prevent said door from being re-set from its closed position without first pushing said support pin upwardly.

* * * * *